(12) United States Patent
Faotto

(10) Patent No.: US 12,188,234 B2
(45) Date of Patent: Jan. 7, 2025

(54) METHOD FOR PROVIDING BITUMINOUS BACKINGS FOR THE CONSTRUCTION INDUSTRY

(71) Applicant: SILCART SPA, Carbonera (IT)

(72) Inventor: Ugo Faotto, Treviso (IT)

(73) Assignee: SILCART SPA, Carbonera (IT)

( * ) Notice: Subject to any disclaimer, the term of this patent is extended or adjusted under 35 U.S.C. 154(b) by 817 days.

(21) Appl. No.: 17/265,043

(22) PCT Filed: Mar. 21, 2019

(86) PCT No.: PCT/EP2019/057109
§ 371 (c)(1),
(2) Date: Feb. 1, 2021

(87) PCT Pub. No.: WO2020/025176
PCT Pub. Date: Feb. 6, 2020

(65) Prior Publication Data
US 2021/0310250 A1    Oct. 7, 2021

(30) Foreign Application Priority Data

Aug. 2, 2018   (IT) .................. 102018000007752

(51) Int. Cl.
*E04D 5/10* (2006.01)
*C10C 3/00* (2006.01)
*D06N 5/00* (2006.01)

(52) U.S. Cl.
CPC ............... *E04D 5/10* (2013.01); *C10C 3/002* (2013.01); *D06N 5/003* (2013.01); *D06N 2203/08* (2013.01); *D06N 2211/06* (2013.01)

(58) Field of Classification Search
CPC .......... E04D 5/10; C10C 3/002; D06N 5/003; D06N 2203/08
See application file for complete search history.

(56) References Cited

U.S. PATENT DOCUMENTS 1,949,229 A * 2/1934 Yeager ................. E04B 1/66
                                                  264/133
3,252,822 A * 5/1966 Burns ................. B29C 70/00
                                                 428/401
(Continued)

FOREIGN PATENT DOCUMENTS

CA    2581395    *  9/2007 ............... B32B 7/14
EP    1842959 A1    10/2007
(Continued)

OTHER PUBLICATIONS

Abhijith, G., et al., "Reinforcement of Bitumen Using Low Density Polyethylene and Green Sand". Materials Today Proceedings, vol. 18, Part 7, 2019, pp. 5057-5062.*

(Continued)

*Primary Examiner* — Bret P Chen
(74) *Attorney, Agent, or Firm* — CANTOR COLBURN LLP

(57) ABSTRACT

A method for providing bituminous backings for the construction industry, includes the following steps obtaining a semi-finished product having a reinforcement to which a bituminous layer is applied, on the outer surface of which inert materials are or are not distributed and/or inside which the inert materials are embedded. The method also includes annealing the semi-finished product, directly following the step of bituminization of the reinforcement or after the step of applying bitumen to the reinforcement so as to embed the inert materials in the bituminous layer, while at the same time drying the outer surface.

10 Claims, 1 Drawing Sheet

(56) References Cited

U.S. PATENT DOCUMENTS

| | | | | |
|---|---|---|---|---|
| 3,330,677 | A * | 7/1967 | Rogers | C08L 95/00 264/129 |
| 8,158,450 | B1 * | 4/2012 | Sheats | H01L 31/0516 438/57 |
| 8,435,599 | B1 | 5/2013 | Standeford et al. | |
| 9,181,456 | B2 | 11/2015 | Hong et al. | |
| 2005/0101210 | A1 * | 5/2005 | Bindschedler | C08L 95/00 442/136 |
| 2005/0130519 | A1 | 6/2005 | Rodrigues et al. | |
| 2007/0054129 | A1 * | 3/2007 | Kalkanoglu | B32B 27/308 428/522 |
| 2008/0248244 | A1 * | 10/2008 | Kalkanoglu | B32B 11/10 156/279 |
| 2009/0291249 | A1 * | 11/2009 | Mehta | E04D 5/10 428/522 |
| 2010/0192805 | A1 * | 8/2010 | Barreto | E01C 19/1063 106/281.1 |
| 2010/0285306 | A1 * | 11/2010 | Shiao | E04D 1/00 428/323 |
| 2012/0097194 | A1 * | 4/2012 | McDaniel | A01N 63/50 435/197 |
| 2014/0338831 | A1 * | 11/2014 | Kalkanoglu | B32B 37/02 156/279 |
| 2015/0038038 | A1 * | 2/2015 | Korley | D04H 1/728 442/166 |
| 2015/0067995 | A1 * | 3/2015 | Rasmussen | B29C 55/065 26/99 |
| 2019/0309226 | A1 * | 10/2019 | Yurchick | C04B 38/0655 |

FOREIGN PATENT DOCUMENTS

| | | | |
|---|---|---|---|
| EP | 2333180 | A1 | 6/2011 |
| EP | 2364841 | A1 | 9/2011 |

OTHER PUBLICATIONS

Chen, Jian-Shiuh, et al., "Mechanism and behavior of bitumen strength reinforcement using fibers". Journal of Materials Science 40 (2005) 87-95.*

Mashaan, Nuha Salim, et al., "A Review on Using Crumb Rubber in Reinforcement of Asphalt Pavement". The Scientific World Journal, vol. 2014, Article ID 214612, pp. 1-21.*

Amuda, M.O.H, et al., "Mechanical Properties of Bitumen Quenched Dual Phase Steel". Sains Malaysiana 46 (5) (2017): 743-753.*

Dos Santos, Salome, et al., "Effect of annealing conditions on the molecular properties and wetting of viscoelastic bitumen substrates by liquids". International Journal of Pavement Research and Technology 10 (2017) 2-14.*

Xia, Tian, et al., "Effect of annealing method and chemical reaction on the structure and properties of polyethylene/polyethylene glycol modified bitumen". Construction and Building Materials 269 (2021) 121228, pp. 1-8.*

International Search Report issued Jun. 21, 2019 re: Application No. PCT/EP2019/057109, pp. 1-4, citing: US 2007/054129 A1, U.S. Pat. No. 9,181,456 B2, EP 1 842 959 A1, US 2005/130519 A1 and U.S. Pat. No. 8,435,599 B1.

Written Opinion issued Jun. 21, 2019 re: Application No. PCT/EP2019/057109, pp. 1-10, citing: US 2007/054129 A1, U.S. Pat. No. 9,181,456 B2, EP 1 842 959 A1, US 2005/130519 A1 and U.S. 8,435,599 B1.

European Office Action for European Application No. 19711916.7, dated Dec. 15, 2023, 8 pages.

European Office Action for Application No. 19711916.7, dated Jul. 26, 2024, 6 pages.

* cited by examiner

METHOD FOR PROVIDING BITUMINOUS BACKINGS FOR THE CONSTRUCTION INDUSTRY

TECHNICAL FIELD

The present disclosure relates to a method for providing bituminous backings for the construction industry, such as underlay (also called roofing underlayments) or backings for insulating panels.

BACKGROUND

Nowadays the essential layers that usually constitute the covering of a building are constituted substantially (starting from the inside and working outward) by a load-bearing structure (wood boarding or concrete slabs), by a vapor barrier or a vapor seal, the purpose of which is to prevent the passage of water vapor (originating from the underlying layers of the building) and its subsequent condensation inside the upper layers, by a layer of insulation to increase the thermal insulation (insulating panel), by a waterproofing underlay or a waterproofing membrane to protect the underlying panel, by an optional layer or layers of ventilation in order to control the hygrometric humidity conditions by way of air recirculation, and by the covering mantle (pantiles, or roof tiles or the like).

Waterproofing membranes are applied above the insulating panel, by way of adhesive substances or by way of torch-bonding of the bitumen contained in them, or waterproofing sheets (underlay) are applied by way of mechanical affixing.

Traditionally it is known to provide insulating panels made of polyurethane using, as backings, paper, bituminized paper or felt-paper, monobituminized fiberglass, fiberglass with mineral coating, aluminum, multilayer film with paper, aluminum and plastic films in different combinations, as described for example in EP2333180B1.

These backings are applied on the insulating panel at the time of producing the insulating panel, making it possible for the polyurethane foam to be contained in the step of expansion thereof and giving dimensional stability to the end product.

The two faces of the insulating panel can be made with the same insulating backing or with different backings, according to the desired finishing and to the application.

Traditionally, in order to provide the insulating backing, an oxidized bitumen was used having high ring&ball values (index of the resistance to temperature of the compound) of 130° C.-160° C. and low penetration values of 2 dmm-8 dmm or, nowadays, distilled bitumen modified with polymers.

A finishing is then applied on the bituminized backing, with inert materials or fabrics or fibrous materials, by way of applying it on the bituminous outer surface.

Such conventional solutions have several drawbacks: the insulating panel thus obtained has a surface finishing in fabric or film with the consequent risks of delamination, and presents grit or other inert materials on the surface, which cause the shedding of dust which causes fouling of equipment (when providing backings for insulating panels), and possible problems of laying and safety for the operators. Furthermore such dust may not be appreciated by the operators both during production and during the laying of such insulating backings.

The application of the finishing furthermore requires a special step, which increases the times and costs at the industrial level.

The presence of grit or other inert materials on the surface of the insulating panel greatly limits compatibility with bituminous or plastic membranes, which are usually applied over the insulating panels by way of torch-bonding or hot air or with self-adhesive membranes.

The presence in fact of non-stick layers, such as those represented by grit or other inert materials, makes it difficult to obtain an excellent adhesion between the surface of the insulating panel and the membrane, and this forces the installers to excessively overuse heat and the application of the flame, thus increasing emissions and/or the formation of carbon compounds in the steps of laying.

The presence of surface dust also impedes an optimal adhesion to self-adhesive membranes, in backings for insulating panels, and to sealants and adhesive strips for overlap selvages, in underlay screens or for walls, as it also does for the application of synthetic membranes, for example polyolefinic or other membranes by way of gluing or hot-application on insulating panels.

SUMMARY

The aim of the present disclosure is therefore to solve the above mentioned technical problems, eliminating the drawbacks in the prior art and hence providing a method that makes it possible to provide bituminous backings for the construction industry, such as underlay or insulating backings to be used to obtain insulating panels, the surface of which is clean due to the absence of grit or other inert materials, so as to prevent the shedding of dust, to keep equipment clean, and to improve the health and safety of operators both during production and during laying.

Within this aim, the disclosure provides a method that makes it possible to prevent possible problems of delamination and to contain the costs and production times of the insulating backings obtained therewith.

The disclosure also provides a method to make it possible to obtain an insulating backing, suitable for storage in rolls, which prevents possible problems of adhesion of the turns in the rolls and also during storage in stacks of the insulating panels obtained therewith.

The disclosure further provides a method that provides the product at low costs and which can be carried out with the usual conventional systems.

This aim and these and other advantages which will become better apparent hereinafter are achieved by providing a method for providing bituminous backings for the construction industry, which is characterized in that it comprises the following steps:

- obtaining a semi-finished product 1 comprising a reinforcement to which a bituminous layer is applied, on the outer surface of which inert materials are or are not distributed and/or inside which said inert materials are embedded;
- annealing said semi-finished product, directly following the step of bituminization of said reinforcement or after said step of applying bitumen to said reinforcement so as to embed said inert materials in said bituminous layer, while at the same time drying said outer surface.

Preferably the annealing of the semi-finished product occurs at a temperature comprised between 50° C. and 500° C.

Even more preferably the annealing of the semi-finished product occurs at a temperature comprised between 80° C. and 250° C.

Even more preferably the step of annealing occurs at a temperature comprised between 140° C. and 220° C.

Advantageously, a bituminous backing for the construction industry is obtained which has inert materials embedded therein and an outer surface which is dry and free from inert materials.

BRIEF DESCRIPTION OF THE DRAWINGS

Further characteristics and advantages of the disclosure will become better apparent from the detailed description of a particular, but not exclusive, embodiment, illustrated by way of non-limiting example in the accompanying drawings wherein.

DETAILED DESCRIPTION OF THE DRAWINGS

Figure 1:
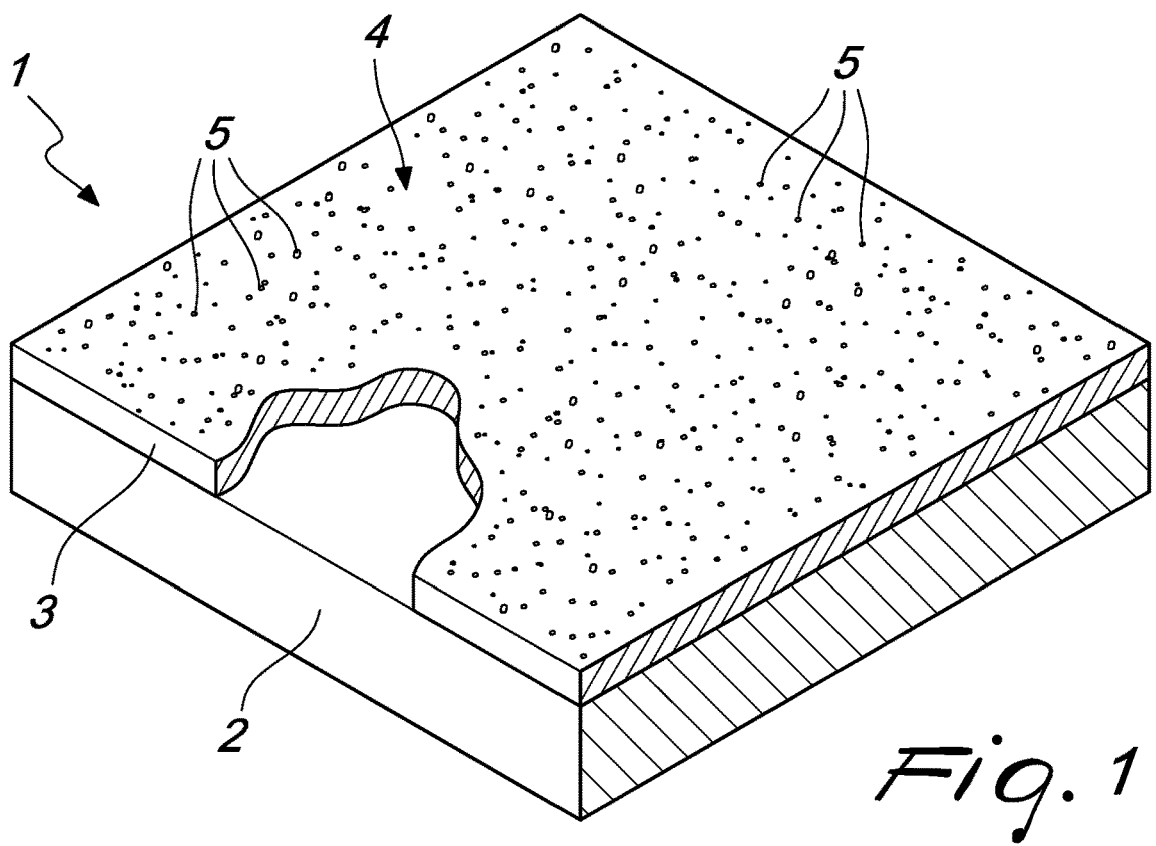
FIG. 1 is a view of the semi-finished product.
Figure 2:
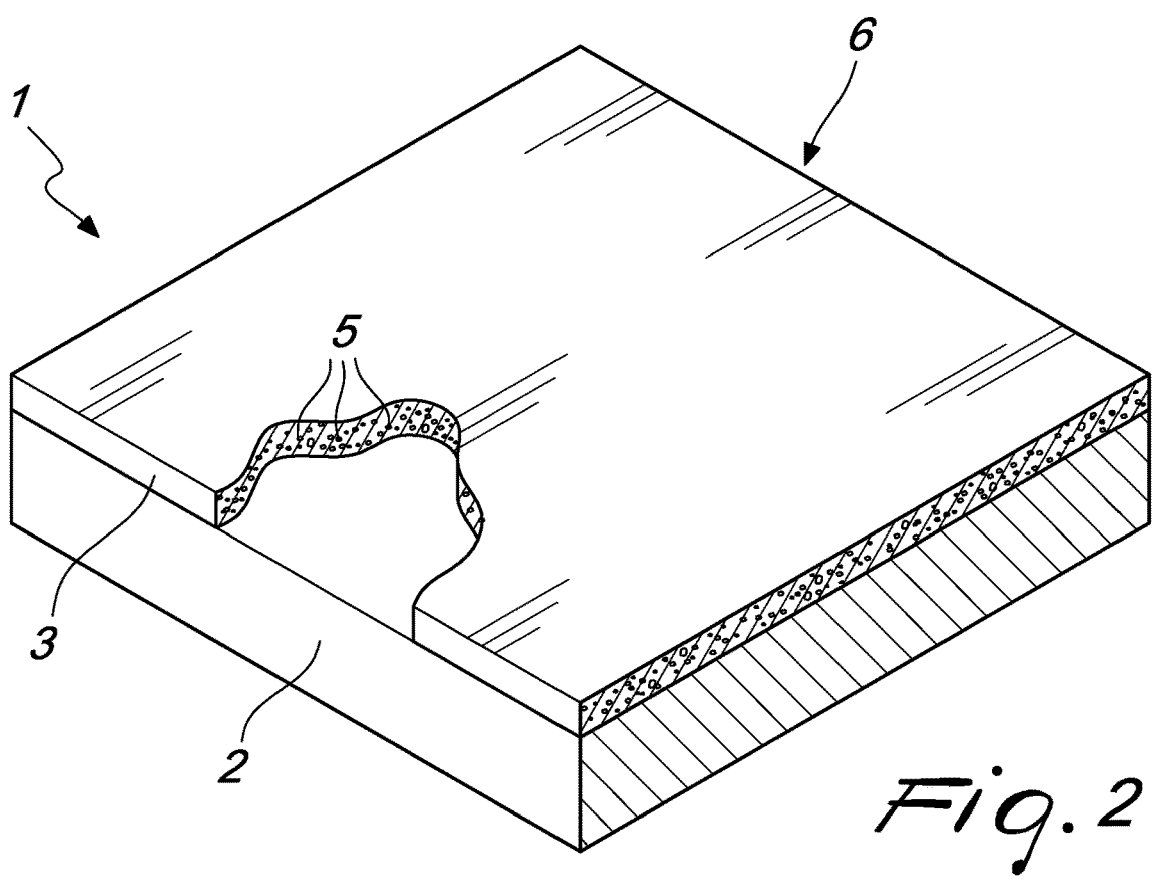
FIG. 2 is a view of the bituminous backing obtained with the method.

In the embodiments illustrated below, individual characteristics shown in relation to specific examples may in reality be interchanged with other, different characteristics of other embodiments.

With reference to the figures, the reference numeral 1 designates a semi-finished product constituted by a reinforcement 2 which is constituted by a fibrous layer made of mineral fibers, synthetic fibers, natural fibers, even hybrid or mixed fibers, in the form of fabrics, non-woven fabrics, or meshes, preferably fiberglass, to which a bituminous layer 3 has been applied, for example distributed, using for example oxidized bitumen, distilled bitumen, bitumen modified with polymers, all with or without fillers, according to what is for example indicated in EP2364841B1 of this same applicant.

The mineral or fibrous inert materials 5, such as grit, talc or calcium carbonate, are distributed on the outer surface 4 of the bituminous layer 3.

These inert materials 5, alternatively or in combination, are embedded inside the bituminous layer 3 during the bituminization.

The method entails performing, immediately following the step of bituminization of the reinforcement 2 or even later, after the bituminous layer 3 has solidified and cooled, the annealing of the semi-finished product 1, to a temperature comprised between 50° C. and 500° C., more preferably between 80° C. and 250° C.

For example, using a bituminous layer 3 with ring&ball values (ASTM D36/D36M standard) comprised between 100° C. and 140° C., it is recommended to carry out an annealing at a temperature even more preferably comprised between 140° C. and 220° C.

Such annealing of the bituminous layer 3, which is already spread on the reinforcement 2, leads to a partial melting and softening thereof.

In this manner the bituminous layer 3 redistributes and levels on the fibers of the reinforcement 2 and the oils that are present in the bitumen tend to evaporate.

The extraction of the oils results in a modification of the bituminous compound with an increase of the ring&ball values and of the mechanical strengths.

The step of annealing must necessarily take place after the bituminization of the reinforcement 2: the hot bitumen in fluid form is spread on the reinforcement 2 and subsequently it is reheated.

The annealing can take place immediately following the bituminization of the reinforcement 2, seamlessly, or it can be carried out in a second process some time later on a different, dedicated apparatus.

The annealing thus embeds the inert materials 5 in the bituminous layer 3; in this manner the bituminous layer 3 is redistributed more evenly, it loses the oily and sticky component, and a plastic layer is obtained that does not require non-stick finishing.

Furthermore the annealing at the same time dries the outer surface 4 of the semi-finished product 1 so as to obtain, once the semi-finished product 1 thus treated has cooled, the final product and therefore the bituminous backing designated in the accompanying figures with the reference numeral 6.

The annealing is performed according to a desired known art, such as, for example, the use of hot plates using resistances, hot plates using infrared, hot air, flames, one or more spells in furnaces, microwaves.

Thus it has been found that the disclosure fully achieves the intended aim and advantages, a method having been obtained that makes it possible to obtain bituminous backings for the construction industry, such as underlay or backings for use in insulating panels, which, starting from a semi-finished product to which a layer of fabric or film has not first been coupled, such as for example a non-woven fabric of polypropylene or a plastic film of PE (polyethylene), have a clean surface owing to the absence of grit and/or other inert materials on their outer surface.

Furthermore the product obtained with the method indicated does not shed dust, thus making it possible to keep the equipment clean, while improving the health and safety of operators both during production of the bituminous backing and during laying of the underlay or of the insulating panel to which the bituminous backing has been applied according to the known art.

For insulating panels, the backing in question can be applied simultaneously with the production of the panel (such as for example with panels of polyurethane or phenolic foam), or it can be applied at a later time to the panel already made, for example for panels made of polystyrene (extruded or expanded) and for fibrous or mineral insulating panels.

The method further makes it possible to obtain a product that is free from delamination and has low costs and production times.

Finally the method makes it possible to obtain bituminous backings for the construction industry, such as underlay membranes or backings for use in insulating panels, which can be stored in rolls thus eliminating possible problems of adhesion of the turns in the rolls and also of insulating panels during the storage thereof in stacks.

Naturally the materials used as well as the dimensions of the individual components of the disclosure may be more relevant according to specific requirements.

The characteristics indicated above as advantageous, convenient or the like, may also be missing or be substituted by equivalent characteristics.

The disclosures in Italian Patent Application No. 102018000007752 from which this application claims priority are incorporated herein by reference.

The invention claimed is:

1. A method for providing bituminous backings for the construction industry, the method including the following steps:
   obtaining a semi-finished product comprising a reinforcement to which a bituminous layer is applied in a step of applying to said reinforcement said bituminous layer in a fluid form, said bituminous layer comprising inert materials; and annealing said semi-finished product, following said step of applying said bituminous layer to said reinforcement, so as to embed said inert materials in said bituminous layer, while at the same time drying an outer surface of said bituminous layer, and obtaining an outer surface of said bituminous layer which is dry and free from said inert materials.

2. The method according to claim 1, wherein directly following the step of applying said bituminous layer to said reinforcement, said annealing of said semi-finished product occurs at a temperature between 50° C. and 500° C.

3. The method according to claim 1, wherein directly following the step of applying said bituminous layer to said reinforcement, said annealing of said semi-finished product occurs at a temperature between 80° C. and 250° C.

4. The method according to claim 1, wherein said reinforcement is constituted by a fibrous layer made of glass fiber or of mineral fibers, synthetic fibers, natural fibers, even hybrid or mixed fibers, in the form of fabrics, non-woven fabrics, or meshes, and wherein said bituminous layer uses oxidized bitumen or distilled bitumen or bitumen modified with polymers, and wherein said mineral or fibrous inert materials are distributed on the outer surface of said bituminous layer.

5. The method according to claim 1, wherein said inert materials are all embedded within said bituminous layer.

6. The method according to claim 1, further including the step of applying said bituminous layer with a temperature between 100° C. and 140° C., and said annealing step occurs at a temperature between 140° C. and 220° C.

7. The method according to claim 4, wherein said step of annealing said bituminous layer applied to said reinforcement leads to a partial melting and softening of said bituminous layer, which redistributes and levels on the fibers of said reinforcement, and the oils that are present in the bitumen tend to evaporate.

8. The method according to claim 1, wherein said annealing step incorporates said inert materials in said bituminous layer and at the same time dries said outer surface so as to obtain, once said semi-finished product thus treated has cooled, a bituminous backing.

9. A bituminous backing for the construction industry, made according to the method of claim 1, comprising mineral or fibrous inert materials embedded therein and an outer surface which is dry and free from inert materials.

10. The method according to claim 8, wherein said bituminous backing is in the form of a roll.

* * * * *